Patented Aug. 20, 1946

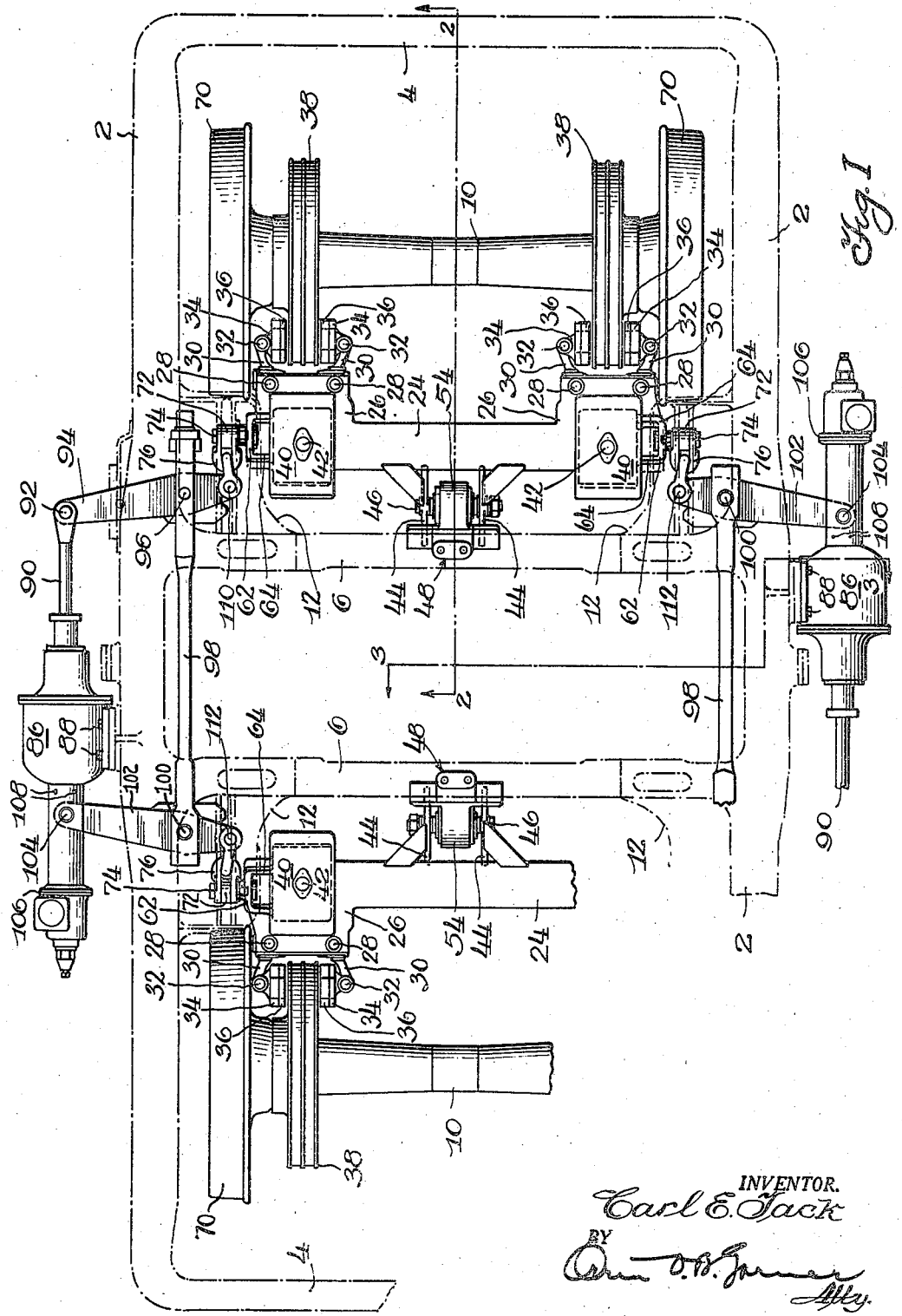

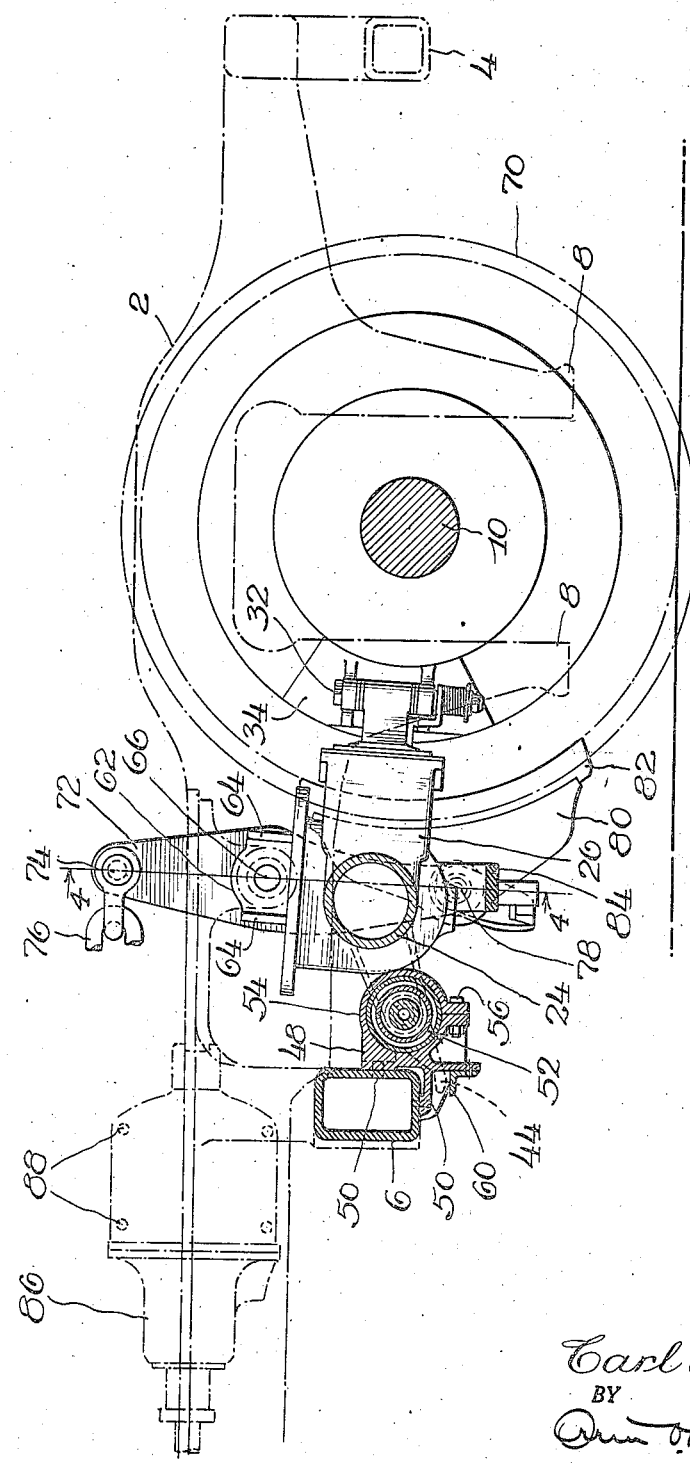

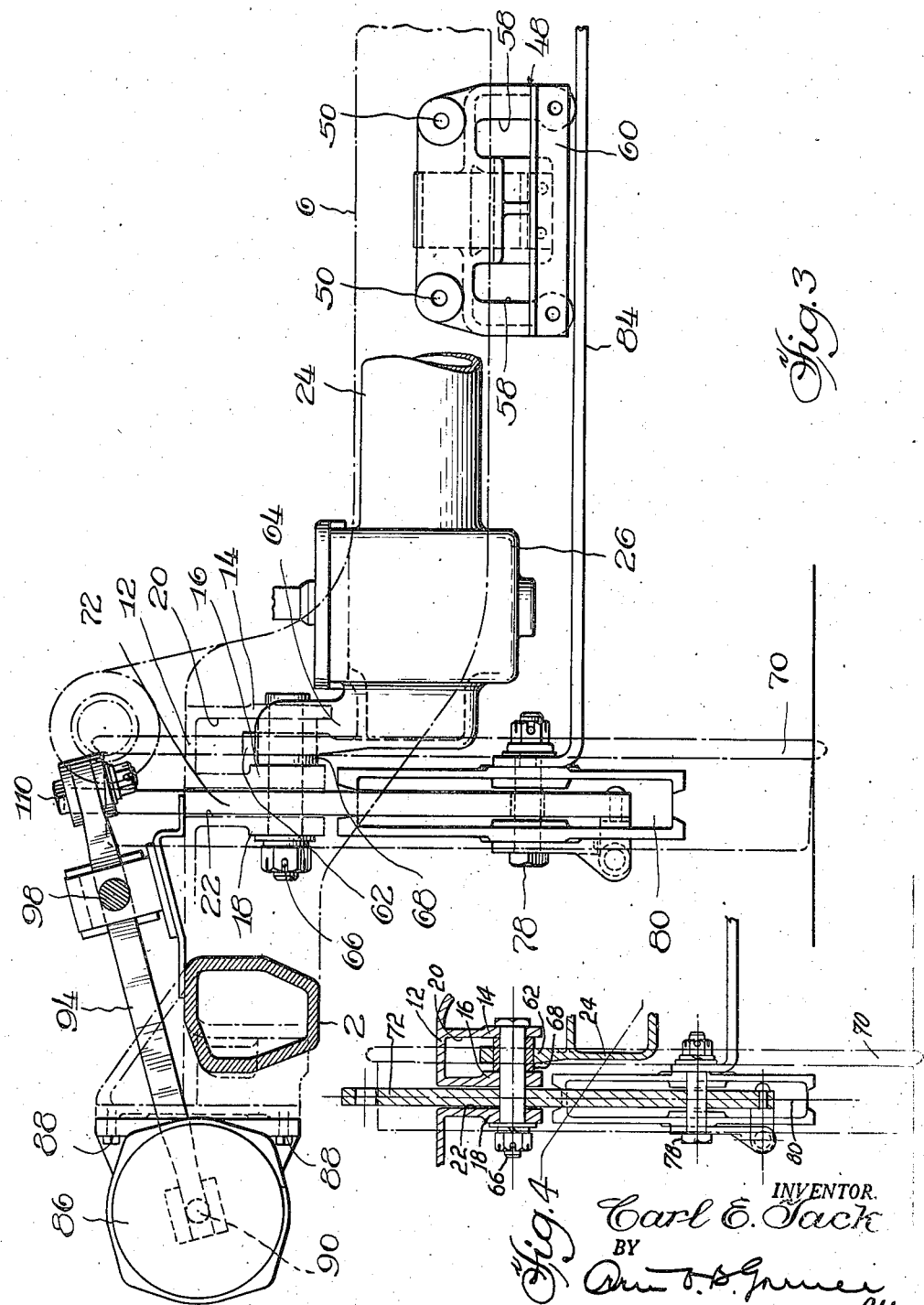

2,406,048

UNITED STATES PATENT OFFICE 2,406,048

RAILWAY BRAKE

Carl E. Tack, Chicago, Ill., assignor to American Steel Foundries, Chicago, Ill., a corporation of New Jersey Application October 4, 1943, Serial No. 504,821

29 Claims. (Cl. 188—53)

My invention relates to brakes and more particularly to brake rigging for a railway car truck.

An object of my invention is to design a "Duplex" or "Duo-Simplex" truck brake comprising braking means for the truck wheels as well as braking means for association with axle-driven discs.

A specific object of my invention is to design a brake of the above-described type in which a brake beam is supported from the truck frame adjacent each axle, said beam being formed with cylinder housings supporting friction means for engagement with brake discs driven by the axles. The rigging is so arranged that a single shoe brake mechanism is disposed at each side of the truck for cooperation with the wheels at that side, said mechanism comprising dead truck levers fulcrumed by the same means affording pivotal support for the ends of the associated brake beams.

A different object of my invention is to design a novel brake rigging for a railway car truck in which a brake beam such as above described extends generally parallel to each axle, said beam being afforded a three-point support from the truck frame, said support including means affording relative lateral movement between the brake beam and the truck frame as the wheel and axle assemblies move laterally of the truck during a braking operation.

In the drawings, Figure 1 is a fragmentary top plan view of a railway car truck embodying my invention, and Figure 2 is a sectional view along the longitudinal vertical plane substantially bisecting the truck as indicated by the line 2—2 of Figure 1.

Figure 3 is a fragmentary sectional view taken in the transverse vertical planes indicated by the line 3—3 of Figure 1.

Figure 4 is a vertical section taken on the line 4—4 of Figure 2.

In each of said figures certain details may be omitted where more clearly seen in other views.

Describing my invention in detail, the truck frame comprises spaced side rails 2, 2, spaced end rails 4, 4, and spaced transoms 6, 6 joining the side rails 2, 2 intermediate the end rails, said transoms being formed and arranged for the support of an associated truck bolster member in the usual manner. At each end thereof each side rail 2 is formed with spaced pedestal legs or jaws 8, 8 (Figure 2) adapted for reception therebetween of a journal box (not shown) associated with the adjacent wheel and axle assembly 10. It will be understood that a conventional equalizer (not shown) is disposed at each side of the truck and is supported from the journal boxes at that side of the truck, the equalizer being provided with resilient means affording support for the truck frame.

At the juncture of each transom 6 with each side rail 2 is formed a gusset 12 and, as clearly seen in Figure 3, each gusset is provided with three spaced lugs 14, 16 and 18 defining the inboard and outboard brackets 20 and 22, said brackets serving a purpose hereinafter described.

Extending substantially parallel to each axle is a brake beam 24, and formed at each end of said beam is a cylinder housing 26 affording pivotal fulcrums at 28, 28 for the brake levers 30, 30, said levers being pivotally connected at 32, 32 with inboard and outboard brake heads 34, 34 carrying friction shoes 36, 36 for engagement with inboard and outboard surfaces of the brake disc 38 mounted to rotate with the adjacent wheel and axle assembly 10. It will be understood that each cylinder housing 26 receives therewithin a cylinder and associated pistons (not shown) for the actuation of the brake levers 30, 30 in the conventional manner, and the top of each housing 26 is provided with a cover 40 having a nozzle or connection 42 through which pressure fluid is furnished to the cylinder within the housing.

Intermediate the ends thereof each brake beam 24 is provided with spaced arms 44, 44, said arms being pivotally connected by means of a pin or bolt and nut assembly 46 to a torque bracket 48 secured as at 50, 50 to the adjacent transom 6, the connection between the arms 44, 44 and the bracket 48 being resilient by means of a composite bushing 52 described in detail in my copending application, Serial No. 421,418, filed December 3, 1941, in the United States Patent Office. The bushing 52 comprises a plurality of alternately telescoped resilient and metallic bushings, the bolt and nut assembly 46 being received within the inner metallic bushing, and the outer metallic bushing being received within the cylindrical portion 54 of the torque bracket 48, said cylindrical portion being split along its lower edge and being provided with a bolt and nut assembly 56 to effect clamping of the cylindrical portion 54 about the metallic bushing 52.

As seen in Figure 3, the bracket 48 comprises the spaced slots 58, 58 for the reception of the extremities of the arms 44, 44, and secured to the bottom of the bracket 48 at the lower extremity of said slots 58, 58 is an angle iron 60, said angle iron affording support for the extremities of the arms 44, 44 in the event that the bolt and nut assembly 46 should fail.

It will be understood from a consideration of Figures 1 and 3 that lateral movements of each wheel and axle assembly 10 during braking engagement of the shoes 36, 36 with the discs 38, 38 will cause the brake beam 24 to move laterally of the truck with the wheel and axle assembly 10, such movement being resisted to some extent by the resilient bushing 52. At each end thereof each beam 24 is provided with an upstanding lug 62 reinforced by the spaced ribs 64, 64, said lug 62 being received within the adjacent gusset bracket 20 and being pivotally secured therewithin as at 66 by means of a bolt and nut assembly (Figure 3) extending through aligned openings in the lugs 14, 16 and 18, said bolt and nut assembly being provided with a bushing 68 received within an opening in the lug 62, said lug being slidable inboardly and outboardly on said bushing 68 to accommodate the above-mentioned lateral movement of the brake beam 24 with respect to the truck frame.

Single shoe brake rigging is provided at each side of the truck for cooperation with the adjacent wheels 70, 70 of the wheel and axle assemblies 10, 10, and said brake rigging comprises the dead truck levers 72, 72, each being fulcrumed at a pivot point 66 by means of the bolt and nut assembly affording support for the adjacent end of the associated beam 24, as best illustrated in Figure 3, the lever 72 being received within the associated gusset bracket 22 and extending upwardly through a slot in the gusset 12 for pivotal connection as at 74 to clevis means 76, the opposite end of said clevis being pivotally connected to the adjacent cylinder lever in a manner hereinafter described.

Each truck lever 72 is pivotally connected at 78 to a brake head 80 carrying a brake shoe 82 for engagement with the periphery of the adjacent wheel 70, and also connected at the point 78 is a tie strap 84 (Figure 3) extending transversely of the truck and affording connection between corresponding truck levers at opposite sides thereof in the conventional manner.

Power means is provided for the single shoe brake rigging in the form of a power cylinder device 86 secured as at 88, 88 to the side rail and comprising the piston rod 90 pivotally connected at 92 to the outboard end of the live cylinder lever 94, said cylinder lever being pivotally and adjustably connected at 96 to a pull rod 98, the opposite end of which is pivotally and adjustably connected at 100 to the dead cylinder lever 102, the outboard end of which is pivoted at 104 to a slack adjuster device 106 mounted at 108, 108 on the power cylinder device 86.

The inboard end of the live cylinder lever is pivotally connected at 110 to the clevis means 76 associated with the dead truck lever 72 at one end of the truck, and the inboard end of the dead cylinder lever 102 is pivotally connected at 112 to the clevis means 76 associated with the truck lever 72 at the opposite end of the truck.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a truck frame having spaced side rails and spaced transoms connected therebetween, a gusset formed at the juncture of each transom with each of said side rails, a pair of brackets depending from each gusset, wheel and axle assemblies supporting said frame and comprising spaced axles with wheels mounted thereon, levers carrying friction means for engagement with the peripheries of said wheels, a brake support member adjacent each of said assemblies, friction means on said support members for engagement with braking surfaces on said assemblies, each end of each of said support members having a lug for reception within one of the adjacent pair of said brackets, said levers being received within the other of said brackets, and pivot means securing said levers to said lugs within the associated brackets, said pivot means comprising a rigid member extending through each of said levers and through the adjacent of said lugs, the connection between said lugs and said rigid members comprising means affording relative lateral movement between the truck frame and said support members.

2. In a brake arrangement for a railway car truck, a truck frame having spaced side rails, spaced end rails, spaced transoms connected between said side rails intermediate said end rails, a gusset formed at the juncture of each transom with each of said side rails, a pair of brackets depending from each gusset, wheel and axle assemblies supporting said frame and comprising spaced axles with wheels mounted thereon, levers carrying friction means for engagement with the peripheries of said wheels, brake beams adjacent said assemblies, said beams carrying friction means for engagement with braking surfaces on said assemblies, each end of each beam having a support lug for reception within one of the adjacent pair of said brackets, said levers being received within the other of said brackets, and a pivot member extending through each of said levers and the adjacent of said support lugs to afford support therefor from the associated brackets, said lugs being slidable on said pivot members to accommodate relative lateral movement between said beams and said truck frame.

3. In a brake arrangement for a railway car truck, a truck frame having spaced side rails, spaced end rails, and spaced transoms joining said side rails intermediate said end rails, a gusset formed at the juncture of each transom with each of said side rails, three lugs depending from each gusset and defining a pair of brackets thereon, aligned openings through said lugs, wheel and axle assemblies supporting said frame and comprising spaced axles with wheels mounted thereon, levers carrying friction means for engagement with the peripheries of said wheels, brake beams adjacent said assemblies, said beams having cylinder housings thereon, friction means supported from said housings for engagement with braking surfaces on said assemblies, each end of each beam having support means for reception within the inboard of said adjacent of said pair of brackets, said levers being received within the outboard of said brackets, and pivot pins extending through said openings, each of said pins extending through one of said levers and one of said support means for pivotal support thereof.

4. In a brake arrangement for a railway car truck, a truck frame having spaced side rails and spaced transoms connected therebetween, a gusset formed at the juncture of each transom with each of said side rails, a pair of brackets depending from each gusset, wheel and axle assemblies supporting said frame and comprising spaced axles with wheels mounted thereon, levers carrying friction means for engagement with the peripheries of said wheels, a brake support member adjacent each of said assemblies, friction means on said support members for engagement with braking surfaces on said assemblies, each end of each of said support members having a lug for reception within one of the adjacent pair of said brackets, said levers being received within the other of said brackets, and pivot means securing said levers and said lugs within the associated brackets, said pivot means comprising a rigid member extending through each of said levers and through the adjacent of said lugs.

5. In a brake arrangement for a railway car truck, a truck frame having spaced side rails, spaced end rails, spaced transoms connected between said side rails intermediate said end rails, a gusset formed at the juncture of each transom with each of said side rails, a pair of brackets depending from each gusset, wheel and axle assemblies supporting said frame and comprising spaced axles with wheels mounted thereon, levers carrying friction means for engagement with the peripheries of said wheels, brake beams adjacent said assemblies, said beams having cylinder housings thereon, friction means supported from said housings for engagement with braking surfaces on said assemblies, each end of each beam having support means for reception within one of the adjacent pair of said brackets, said levers being received within the other of said brackets, and a pivot member extending through each lever and the adjacent of said support means.

6. In a brake arrangement for a railway car truck, a truck frame having spaced side rails, spaced end rails, spaced transoms connected between said side rails intermediate said end rails, a gusset formed at the juncture of each transom with each of said side rails, a pair of brackets depending from each gusset, wheel and axle assemblies supporting said frame and comprising spaced axles with wheels mounted thereon, levers carrying friction means for engagement with the peripheries of said wheels, brake beams adjacent said assemblies, said beams carrying friction means for engagement with braking surfaces on said assemblies, each end of each beam having support means for reception within one of the adjacent pair of said brackets, said levers being received within the other of said brackets, and a pivot member extending through each of said levers and the adjacent of said support means to afford support therefor from the associated brackets.

7. In a brake arrangement for a railway car truck, a truck frame having spaced side rails and spaced transoms connected therebetween, a gusset formed at the juncture of each transom with each of said side rails, a pair of brackets depending from each gusset, wheel and axle assemblies supporting said frame and comprising spaced axles with wheels mounted thereon, levers carrying friction means for engagement with the peripheries of said wheels, a brake support member adjacent each of said assemblies, friction means on said support members for engagement with braking surfaces on said assemblies, each end of each of said support members having means for reception within one of the adjacent pair of said brackets, said levers being received within the other of said brackets, and pivot means securing said levers and said last-mentioned means within the associated brackets.

8. In a railway car truck, a truck frame including spaced side rails and spaced transoms extending therebetween, a gusset formed at the juncture of each transom with each side rail, spaced supporting wheel and axle assemblies, each including an axle and a brake member rotatable therewith, a rigid support member extending substantially parallel with each assembly, a depending bracket formed on each gusset for the reception of a portion of the adjacent support member, and pivot means securing said portions within said brackets, said portions being capable of limited inboard and outboard movement on said pivot means to accommodate relative movement between said support members and said frame, and friction means on said support members for engagement with the associated of said brake members.

9. In a railway car truck comprising a truck frame and spaced wheel and axle assemblies each including an axle with wheels thereon, brake beams adjacent said assemblies, friction means on said beams for engagement with braking surfaces on said assemblies, dead truck levers carrying friction means for engagement with the peripheries of the associated wheels, a pin pivoting each of said levers to said frame and extending through a portion of the adjacent beam to afford support therefor, and actuating means for said truck levers comprising power means on said frame, interconnected live and dead cylinder levers connected to opposite ends of said power means, and an operative connection between each cylinder lever and the adjacent truck lever.

10. In a brake arrangement, a vehicle frame, a supporting wheel and axle assembly including a wheel and a brake member adjacent thereto, a brake beam adjacent said assembly, a lever carrying friction means for engagement with the periphery of said wheel, a pivot pin connecting said brake beam to said vehicle frame, said pin affording a pivotal fulcrum for said lever, friction means carried by said brake beam for engagement with said brake member, and actuating means for said lever including a power cylinder device secured to said frame, a cylinder lever, an operative connection between said device and said cylinder lever, and an operative connection between said cylinder lever and said first-mentioned lever.

11. In a railway car truck comprising a truck frame and spaced wheel and axle assemblies, each including an axle with wheels thereon, brake beams adjacent said assemblies, friction means on said beams for engagement with braking surfaces on said assemblies, dead truck levers carrying friction means for engagement with the peripheries of the associated wheels, and means pivoting said levers and said beams to said frame, said last-mentioned means including means permitting movement of said beams laterally of the truck to accommodate relative lateral movement between said assemblies and said frame during engagement of said first-mentioned friction means with said braking surfaces.

12. In a railway car truck comprising a truck frame and spaced wheel and axle assemblies each including an axle with wheels thereon, brake beams adjacent said assemblies, friction means on said beams for engagement with braking surfaces on said assemblies, dead truck levers comprising friction means for engagement with the peripheries of the associated wheels, and a pin pivoting each of said levers to said frame and extending through a portion of the adjacent beam to afford a support therefor, said beams being shiftable laterally of the truck on said pins to accommodate relative lateral movement between said frame and said beams.

13. In a brake arrangement, a vehicle frame, supporting wheel and axle assemblies including spaced axles and wheels mounted thereon, brake levers carrying friction means for engagement with the peripheries of said wheels, pivot means pivotally fulcruming said levers from said frame, and friction means supported from said pivot means and adapted for engagement with brake surfaces on said assemblies, said friction means including a support member, spaced brake levers fulcrumed from said support member, and brake shoes carried by respective levers.

14. In a railway car truck comprising a truck frame and spaced wheel and axle assemblies, each including an axle with wheels thereon, brake beams adjacent said assemblies, friction means on said beams for engagement with braking surfaces on said assemblies, dead truck levers carrying friction means for engagement with the peripheries of the associated wheels, and a pin pivoting each of said levers to said frame and extending through a portion of the adjacent beam to afford support therefor.

15. In a railway car truck, a truck frame and spaced wheel and axle assemblies, each including an axle with wheels thereon, brake beams adjacent said assemblies, friction means on said beams for engagement with braking surfaces on said assemblies, dead truck levers carrying friction means for engagement with the peripheries of the associated wheels, and common means pivoting each of said levers and a portion of the adjacent beam to said frame.

16. In a railway car truck comprising a truck frame and spaced wheel and axle assemblies, each including an axle with wheels thereon, brake beams adjacent said assemblies, friction means on said beams for engagement with braking surfaces on said assemblies, dead truck levers carrying friction means for engagement with the peripheries of the associated wheels, and means pivoting each lever and the associated beam at a common point to said frame.

17. In a brake arrangement, a vehicle frame, a supporting wheel and axle assembly including a wheel and a brake member adjacent thereto, a brake beam adjacent said assembly, a lever carrying friction means for engagement with said wheel, a pivot pin connecting said brake beam to said vehicle frame, said pin affording a pivotal fulcrum for said lever, and friction means carried by said brake beam for engagement with said brake member.

18. In a brake arrangement, a vehicle frame, a supporting wheel and axle assembly including a wheel, a radial brake surface on said assembly, brake support means adjacent said surface, a lever carrying friction means for engagement with the periphery of said wheel, pivot means connecting said brake support means to said frame, said pivot means also affording a pivotal fulcrum for said lever, and friction means supported by said support means for engagement with said surface.

19. In a brake arrangement, a vehicle frame, supporting wheel and axle assemblies including spaced axles and wheels mounted thereon, brake levers carrying friction means for engagement with the peripheries of said wheels, pivot means pivotally fulcruming said levers from said frame, and friction means supported from said pivot means and adapted for engagement with brake surfaces on said assemblies.

20. In a vehicle structure, a frame comprising spaced side rails and spaced transoms connected therebetween, a brake beam adjacent each transom, a brake lever adjacent each end of each beam, a gusset formed at the juncture of each transom with each side rail, lugs depending from each of said gussets and defining therewith a pair of inboard and outboard brackets, aligned openings in said lugs, and pivot means extending through each of said openings and an associated brake lever and brake beam.

21. In a brake arrangement, a truck frame comprising spaced side rails and spaced transoms connected therebetween, supporting wheel and axle assemblies including spaced axles and wheels mounted thereon, brake levers carrying friction means for engagement with the peripheries of the associated wheels, brake beams extending between said side rails substantially parallel with the respective wheel and axle assemblies, friction means on said beams for engagement with friction surfaces on said assemblies, and support means on said frame at the juncture of each transom with each side rail for said beams and said levers, said support means comprising common pivot means for pivoting each of said levers and a portion of the adjacent beam to said frame.

22. In a brake arrangement for a railway car truck, a truck frame comprising spaced side rails and spaced transoms connected therebetween, a gusset formed at the juncture of each transom with each of said side rails, a bracket depending from each gusset, wheel and axle assemblies supporting said frame, a brake support member adjacent each of said assemblies, a brake support member adjacent each end of each assembly, friction means on said support members for engagement with braking surfaces on said assemblies, and common pivot means securing each of said last-mentioned support members and each end of each of said first-mentioned support members to the adjacent bracket.

23. In a brake arrangement for vehicles, a frame supporting spaced side rails and spaced transoms connected therebetween, a gusset formed at the juncture of each transom with each of said side rails, a bracket depending from each gusset, wheel and axle assemblies supporting said frame, brake beams adjacent said assemblies, said beams carrying friction means for engagement with braking surfaces on said assemblies, and each end of each beam having a support lug for reception within the adjacent bracket and a pivot member extending through each associated lug and bracket to afford support for said beams, and a brake support member supported from said pivot member and carrying friction means for engagement with an adjacent wheel.

24. In a brake arrangement for vehicles, a frame having spaced side rails and spaced transoms connected therebetween, a gusset formed at the juncture of each transom with each side rail, spaced supporting wheel and axle assemblies, each including an axle and a brake member rotatable therewith, a brake beam extending substantially parallel with each assembly, a depending bracket formed on each gusset for the reception of a portion of the adjacent brake beam, pivot means securing said portions within said brackets, and friction means on said beams for engagement with an associated brake member; and a brake lever supported from said pivot means and carrying friction means for engagement with a braking surface on the adjacent assembly spaced from the brake member thereon.

25. In a brake arrangement, a vehicle frame, a supporting wheel and axle assembly including a wheel and a brake member adjacent thereto, a brake beam adjacent said assembly, a lever carrying friction means for engagement with the periphery of said wheel, pivot means connecting said brake beam to said vehicle frame, said pivot means also affording a pivotal fulcrum for said lever and permitting limited inboard and outboard movement of said beam to accommodate relative movement between said beam and said frame, and friction means carried by said brake beam for engagement with said brake member.

26. In a brake arrangement, a vehicle frame, a supporting wheel and axle assembly including a wheel and a brake rotor, spaced brake support members adjacent said assembly, common pivot means supporting said members from said frame, and friction means carried by one of said members for engagement with said wheel and friction means carried by the other of said members for engagement with said rotor.

27. In a brake arrangement, a vehicle frame, a supporting wheel and axle assembly including a wheel and brake member adjacent thereto, a brake beam adjacent said assembly, pivot means connecting said beam to said frame, friction means carried on said beam for engagement with said brake member, and a brake support member supported from said pivot means and carrying friction means for engagement with said wheel.

28. In a brake arrangement, a vehicle frame including spaced side rails and spaced transoms connected therebetween, wheel and axle assemblies supporting said frame and comprising spaced axles with wheels and brake members mounted thereon, a brake beam adjacent each assembly, a support member adjacent each end of each assembly, common pivot means connecting each member and an adjacent portion of each beam to said frame at the juncture of each transom with each of said side rails, and friction means on said beams and support members for engagement with the associated of said brake members and wheels.

29. In a brake arrangement for a car truck including a truck frame and a supporting wheel and axle assembly, the combination of friction means for engagement with the tread surface of said wheel, friction means for engagement with a substantially radial surface of said assembly, a support member for each of said friction means, and a pivot pin pivotally connecting both of said members to said truck frame.

CARL E. TACK.